US008095580B2

(12) United States Patent
Reddy et al.

(10) Patent No.: US 8,095,580 B2
(45) Date of Patent: Jan. 10, 2012

(54) PROVIDING CONTENT TO USERS

(75) Inventors: Prakash Reddy, Fremont, CA (US);
Steven T. Rosenberg, Palo Alto, CA (US); Andrew Bolwell, Santa Cruz, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 403 days.

(21) Appl. No.: 11/974,154

(22) Filed: Oct. 11, 2007

(65) Prior Publication Data

US 2009/0100020 A1   Apr. 16, 2009

(51) Int. Cl.
*G06F 17/30* (2006.01)
(52) U.S. Cl. .............. 707/913; 707/999.107; 726/26; 713/193
(58) Field of Classification Search .............. 705/26, 705/51, 10; 725/137; 709/207; 707/736, 707/741, 750, 999.003, 999.005, 913, 999.107; 704/9; 715/231; 726/26; 713/193
See application file for complete search history.

(56) References Cited

U.S. PATENT DOCUMENTS

| | | | |
|---|---|---|---|
| 3,982,744 A * | 9/1976 | Kraynak et al. ................ 270/12 |
| 5,517,407 A * | 5/1996 | Weiner .............................. 704/1 |
| 5,983,243 A * | 11/1999 | Heiney et al. ................ 715/235 |
| 6,029,141 A | 2/2000 | Bezos et al. |
| 6,088,710 A * | 7/2000 | Dreyer et al. ................ 715/246 |
| 6,205,452 B1 * | 3/2001 | Warmus et al. ............... 715/246 |
| 6,246,993 B1 * | 6/2001 | Dreyer et al. ................ 705/7.26 |
| 6,332,149 B1 * | 12/2001 | Warmus et al. ............... 715/246 |
| 6,345,256 B1 * | 2/2002 | Milsted et al. ................. 705/64 |
| 6,418,421 B1 * | 7/2002 | Hurtado et al. ................ 705/54 |
| 6,587,837 B1 * | 7/2003 | Spagna et al. ................. 705/52 |
| 6,844,940 B2 * | 1/2005 | Warmus et al. ............. 358/1.18 |
| 7,117,523 B2 * | 10/2006 | Kasahara et al. ............ 725/137 |
| 7,124,094 B1 * | 10/2006 | Kobayashi et al. ............ 705/26 |
| 7,149,783 B2 * | 12/2006 | Frolik et al. ................. 709/207 |
| 7,154,635 B2 * | 12/2006 | Oyama ......................... 358/1.9 |
| 7,206,748 B1 * | 4/2007 | Gruse et al. .................... 705/51 |
| 7,207,557 B2 * | 4/2007 | Kaneko et al. ............ 270/58.08 |
| 7,251,784 B2 | 7/2007 | Kessenich et al. |
| 7,278,084 B2 * | 10/2007 | Palin et al. .................... 714/758 |
| 7,437,672 B2 * | 10/2008 | Myers ........................... 715/719 |
| 7,509,270 B1 * | 3/2009 | Hendricks et al. ............. 705/26 |
| 7,620,569 B2 * | 11/2009 | Chiarabini et al. ............ 705/26 |
| 7,639,386 B1 * | 12/2009 | Siegel et al. ................ 358/1.18 |
| 7,699,572 B2 * | 4/2010 | Kaneko et al. ................. 412/37 |
| 7,706,736 B2 * | 4/2010 | Watanabe .................... 399/361 |
| 7,802,932 B2 * | 9/2010 | Mima ............................ 400/76 |
| 7,962,413 B2 * | 6/2011 | Lisanke et al. ................ 705/50 |
| 7,962,750 B1 * | 6/2011 | Gruse et al. .................. 713/171 |
| 2002/0002468 A1 * | 1/2002 | Spagna et al. .................... 705/1 |
| 2002/0049781 A1 | 4/2002 | Bengtson |

(Continued)

FOREIGN PATENT DOCUMENTS

WO   WO 2000/016210 A1   3/2000

(Continued)

*Primary Examiner* — Jean M Corrielus (57) ABSTRACT

A method of providing content to users, with a tool incorporated in a website, includes searching a content database; selecting content from the database; and printing the selected content in book form. A system for providing content includes a content tool; and a service module. The content tool is incorporated in a website and is in communication with the service module. The content tool and service module allow visitors to the website to search, select and customize content located in a database accessible to the service module. The content tool and service module allow the visitors to order a copy of the content.

19 Claims, 6 Drawing Sheets

U.S. PATENT DOCUMENTS

| | | |
|---|---|---|
| 2002/0152087 A1 | 10/2002 | Gonzalez |
| 2003/0078856 A1 | 4/2003 | Zubi |
| 2005/0114208 A1 | 5/2005 | Arbuckle et al. |
| 2006/0085343 A1* | 4/2006 | Lisanke et al. .................. 705/50 |
| 2006/0089912 A1* | 4/2006 | Spagna et al. .................. 705/51 |
| 2006/0195461 A1 | 8/2006 | Lo et al. |
| 2006/0230340 A1 | 10/2006 | Parsons et al. |

FOREIGN PATENT DOCUMENTS

| | | |
|---|---|---|
| WO | WO 2006/089137 A1 | 8/2006 |

\* cited by examiner

PROVIDING CONTENT TO USERS

BACKGROUND

In modern society, people have ready access through a wide variety of sources to information about subjects of interest. This access to information clearly benefits consumers who want information in their areas of interest. However, ubiquitous access to information also benefits an array of business interests that can capitalize on consumer's interests.

Among the various techniques for delivering information and content to consumers, many people turn to the Internet to find the information they desire. There are internet sites devoted to just about every conceivable subject. However, there is still a strong interest in, and need for, information in print form. Books and other printed materials are still in high demand.

Traditionally, the distribution of books to consumers is accomplished through retail stores, including on-line ordering over the Internet. Such retail book sellers typically purchase volume quantities of thousands of different book titles from book publishers and then offer these titles for resale. In a typical retail bookstore, the major expenses of doing business might include rental or purchase of store or warehouse space, employee wages and benefits, and inventory maintenance costs including interest on loans and economic losses created by shoplifting, employee pilferage, damage to inventory from customer handling and inventory that does not sell. Further costs might include those of physically shipping and handling of books.

In particular, the retail book seller must always attempt the impossible task of accurately predicting future demand for the myriad of books on the market. Conversely, a consumer may be frustrated in trying to find a particular book which because of its age or the nature of its subject matter does not provide enough public demand to remain in print or be carried by most retailers. A system of ordering such books might be available through a retail store. However, the customer must wait usually days or weeks to receive the book by this method, if the book is in print and not unavailable.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification addresses the need and desire of a website operator to provide additional information and resources related to the subject matter of the website to a person or customer visiting the site. Once a person has visited a particular website, it is highly likely that the visitor has an interest in the subject matter of that website, which indicates a commercial opportunity for the website operator to sell goods or services related to that subject matter. In particular, the website operator may have a particular opportunity to sell books or content in book form related to the subject matter of the operator's website. However, if the website merely directs visitors to other sites selling related books, most of the commercial benefit from attracting the visitor in the first place is lost.

Consequently, the present specification provides a tool that allows any website operator to make book sales from their own website. Moreover, the tool described allows users to customize the content of the book being purchased to enhance customer interest in making a purchase. The operator of the website may also customize products sold through the tool. For example, by incorporating a logo, name, special cover, or targeted advertising into content selected or produced using the tool.

An alternative technique for delivering books to consumers that addresses many of the issues with the conventional retail model is called on-demand publishing. On-demand publishing has evolved in recent years as a result of the development of digital printing and generally refers to a process or method of only printing a book or other material after an order for that material has been received. The printed item is generally associated with a fixed cost per copy, irrespective of the size of the order. The price of each copy printed might be higher than books printed in a more traditional volume process. However, when setup costs are taken into account, on-demand printing provides lower overall costs for smaller print runs than other printing methods.

There are several other advantages to the printing-on-demand system. First, large inventories of a book or print do not need to be kept in stock. Second, because books are not printed until after the book is ordered, there is no risk of printing more copies than will be wanted by consumers. Additionally, because setup is usually quicker and less expensive that for other printing methods, and because smaller quantities can be printed, more titles may be available to consumers. Specifically, there is no need for any title to be unavailable or "out of print."

As described in this specification, this ability to print-on-demand can be interfaced with activity on the Internet to generate additional book sales and to provide additional revenue to website operators who attract visitors interested in the subject matter of the website or related subjects. As noted above, the Internet is the first resource to which most people turn to locate information or content related to a subject of interest. Sites that do a better job providing content of interest to visitors will be more successful in attracting additional visitors. Consequently, websites have an interest in providing resources and content in a subject area that meets or exceeds user interest levels.

Currently, websites may facilitate access to site-relevant content for visitors in several different ways. For example, websites often include site-based "pop-up" or "click-through" advertising. This advertising may refer visitors to content-related products or services available from that website or other sites. However, this advertising may be distracting, and may or may not meet the user's needs for more resources in a particular subject area. Moreover, if the pop-up or click-through advertising refers the visitor to another website, this redirection of visitors may be less than ideal for the original site owner because traffic is thus routed away from the original site.

A website may also craft web queries on the topic of the website and provide visitors with the results generated from a general search engine such as Google®. The results of such a search may return for example a listing for a book on the subject available for purchase from Amazon.com®. Again, these alternatives may disrupt the user's session with the initial web site, and there is no guarantee that the generated information is relevant or useful to the user.

Another way that websites may provide access to additional site-relevant information or resources is by providing a list of recommended links that may allow users to follow a trail of interest. This method may work well to help users find the information or resources they desire. However, the original referring website is again in the position of losing the attention of the visitor and further commercial opportunity to interact with or make sales to that visitor. In particular communities, a website might benefit from having some visitors link in from a related website to which the current website also refers traffic. However, this does not necessarily account for opportunities lost by referring visitors to other websites, particularly if the referring website is able to attract significant traffic, but is not tied to a commercial enterprise that offers related goods or services, particularly books, to the visitors attracted.

Accordingly, the present specification describes a tool that may be easily incorporated into any website and which allows users to find and browse books or content that can be incorporated into a book. The tool further allows users to customize the content to be printed in book form and order copies of either standard or customized books. Additionally, the tool may be configured to fit with the look and feel of the incorporating website. This tool may be communicatively coupled with a backend service which maintains a database of books and content that can be selectively incorporated into book form, a search engine for the database, supporting tools for customizing books, and the ability to publish print-on-demand books, including customized, one-of-a-kind books.

The tool may benefit website owners by allowing them to offer relevant content to their visitors without losing the visitors to another site. This may increase customer loyalty and also increase revenues. The customers are also benefited by being offered relevant, customizable content in book form without having to travel to another website. Increased sales will also benefit the owners of the content being provided.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

Illustrative Systems

Figure 1:
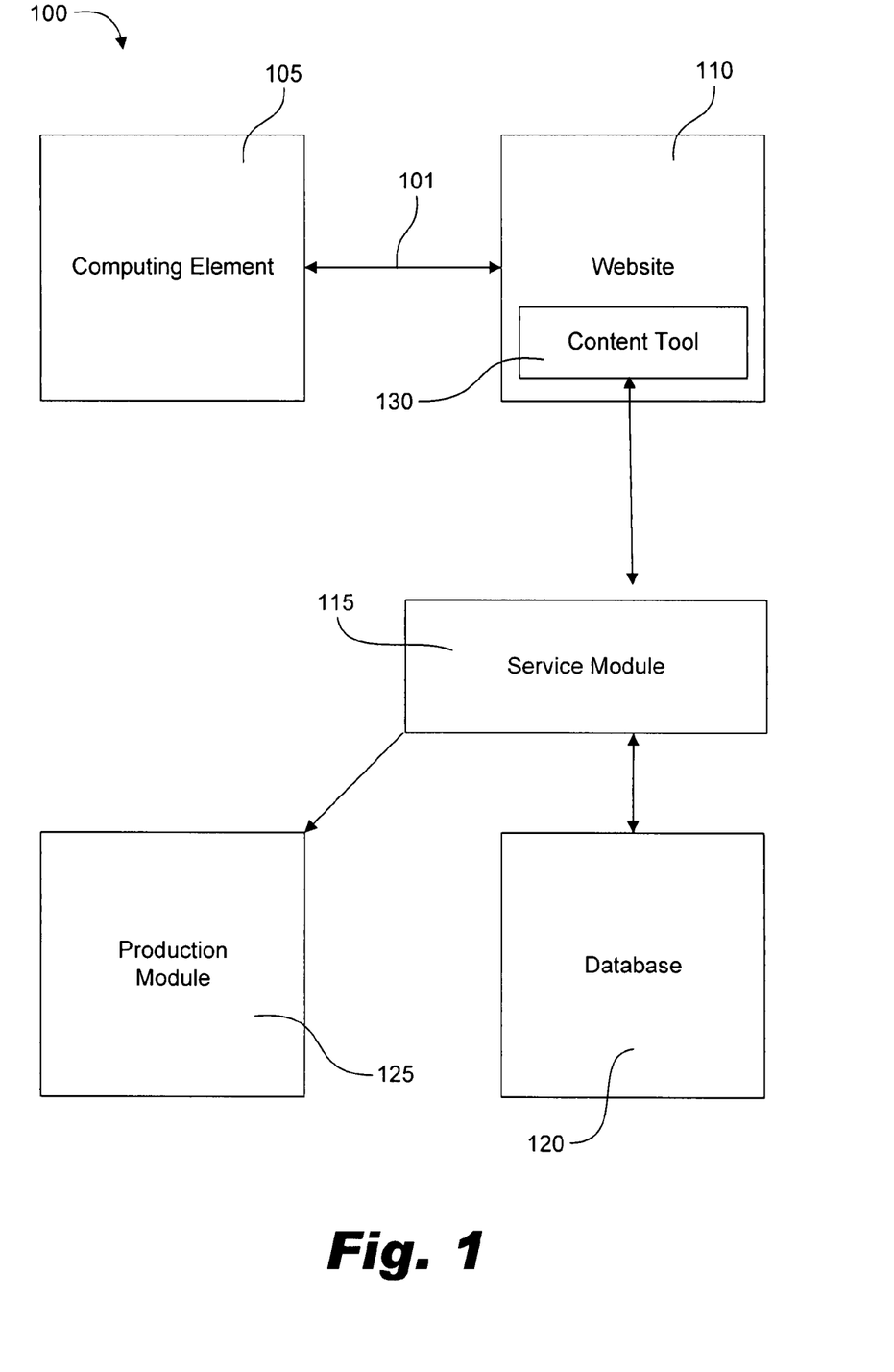
FIG. 1 is a diagram of an illustrative system according to principles described herein.

FIG. 1 is a block diagram showing an illustrative system (100) according to the principles of the present specification. The system (100) includes a computing element (105), a website (110), a service module (115), a database (120), a production module (125), and a content tool (130). In the system (100) of the present embodiment, the computing element (105) is communicatively connected to the website (110). The computing element (105) may include a browser such as Internet Explorer® or Mozilla Firefox®, for example, in order to allow the user of the computing element (105) to surf and view websites. The website is preferably found on the World Wide Web, but alternatively may be located on any network or machine that will allow a user to access it. In a typical embodiment, the computing element (105) of the present system is a personal computer or laptop which is operated by a user and which has a connection to a network (101), such as the Internet, that provides access to the server or servers supporting the website (110). However, as will be appreciated by those skilled in the art, the computing element (105) can be any interactive computing device, including, but not limited to, a cell or mobile phone, personal digital assistant, a smart phone, an MP3 player, a dedicated kiosk or workstation, etc.

During the user's search for content, either through use of a search engine or by other means, the user may be directed to the website (110) of the current system. The website (110) may be devoted to a particular subject or may discuss a variety of subjects. According to the principles described in the present specification, the website (110) may include a content tool (130). As noted above, the tool (130) may be configured to match the look and feel of the website (110). For example, the tool may be skinned to be similar or identical to the look and feel of the originating website, thereby enhancing the customer's experience of staying within or interacting only with the originating website. In other words, the tool may have the same colors, formatting, font, layout or other design elements in common with the originating website to provide the single impression on the user.

This tool (130), which may be incorporated into any website, interfaces with a service module (115). The service module (115) may be one or more servers that support the functionality of the tool (130). The service module (115) may be located with the server supporting the website (110) or may be in a separate location and communicating with the tool (130) via a network, such as the Internet, or other data link.

Through the use of the tool (130), a user operating the computing element (105) and viewing the website (110) can access, search and browse content that is stored in a database (120) of the service module (115). The database (120) may represent one or more servers located in one or more locations that store a library of content on a particular subject or a variety of subjects. As will be described herein, this content can be selected and ordered in book or print form using on-demand publishing. The information available in the database (120) may be or include information that is specifically correlated to the subject matter of the website (110).

More specifically, the service module (115) provides access through the content tool (130) and website (110) to the content in the database (120). The service module (115), controlled by the user through the content tool (130), is configured with a search engine for searching the database (120) based on specific queries entered by the user of the computing element (105). The service module (115) will serve up content from the database (120) based on user queries or commands and allow the user of the computing element (105) to browse the identified content through the content tool (130) and website (110). Consequently, the operator of the website (110) has the ability to provide access to additional site-related content without directing the visitor away from the website (110).

In order to facilitate the user's search for content in the database (120), the service module (115) may narrow a particular search in order to make the search more relevant to the current context. For example, if the user is currently viewing a site dedicated to recipes, the service module may only search those items of the database (120) related to foods, cooking, etc. This may require the website owner's cooperation in specifying the suitable categories for their website (110). Limiting the search context to the subject matter of or specified by the website allows the total experience to correspond to the experience of visiting the website. The categories may then be fine tuned over time to improve the relevance and search time. In some embodiments the website owner may also choose to pre-populate the database (120) or search returns with relevant and popular content.

During the course of this searching and browsing in the content of the database (120), the user may select content that he or she wishes to purchase in book or print form. In some instances, this selected content will correspond to a particular book. The user can then place an order for that book through the content tool (130) on the website (110). Alternatively, the user may select content from several different books or works available in the database (120) and place an order to have that content published in a single customized volume or book. Again, this all may be accomplished without the user having to leave the original website (110).

In addition to selecting content from various sources within the database, customization of content being ordered may occur in several different ways. For example, the user may be allowed to annotate, comment on, or review the content. This may include adding notes or other comments to materials from the database. Such user-generated content can be entered, for example, through the user interface of the computing element (105) and conveyed through the website (110) and content tool (130) to the service module (115). Additionally or alternatively, the user may upload files with additional content through the website (110) and tool (130) to the service module (115). This content might be, for example, personal content like photos, recipes, etc., or could be selections of professional content. For example, a user might choose to print a professional cookbook selected from the database (120) in a certain size, but using a personal photo for the cover and including several personal recipes at the back of a book to create a unique cookbook.

It will be understood that any means or method of customizing the content is contemplated within the scope of this disclosure. Additional examples include personalized covers and dedication pages for the book. In other examples, the customer may use an uploaded picture to replace portions of images from the database content. For example, replacing the face of a character within the illustrations of a book from the database, e.g., in a story of Cinderella, Cinderella's face is an uploaded picture of the customer's six year old daughter.

In any of these examples, the service module (115) can then combine any content received from the user of the computing element (105) with selected content from the database (120) as directed by the user. The content tool (130) will include tools for laying out, organizing, combining and formatting any combination of user-provided and database (120) content. Additionally, the tool (130) may allow the user to select from various pre-defined print options for the printing of the selected content. Such options may include, for example, different covers, page quality, binding method, size, or the like.

After selecting and organizing the content, the tool (130) will allow the user to preview the customized book. If the user is satisfied with the book and the price, the user then operates the tool (130) to place an order for the book without ever leaving the initial website (110). The service module (115) handles the publishing request through the production module (125). The service module (115) may also automatically compute a commission or value earned by the website (110) owner for the sale.

Once the user has placed an order for content, whether a particular book title or a custom compilation of content in book form, the service module (115) will communicate with the production module (125) in order to facilitate the printing, binding, and shipping of the content. The production module (125) may include a print-on-demand publishing operation that will print and bind, if desired, the content ordered by the user in book form. In other embodiments, the production module (125) may produce content as an e-book, an interactive book with electronic elements built in, a compact disc-read only memory (CD-ROM), a digital video disc (DVD) or any other form desired by a user. The content in such embodiments may be text, images, music or video, any of which may be customized by the purchaser as described herein. In some embodiments, the on-demand publishing operation may be supplemented with an inventory of books or content on other media for those instances when an order is placed for content without any customization. In any case, the product is then shipped or otherwise distributed to the customer.

Figure 2:
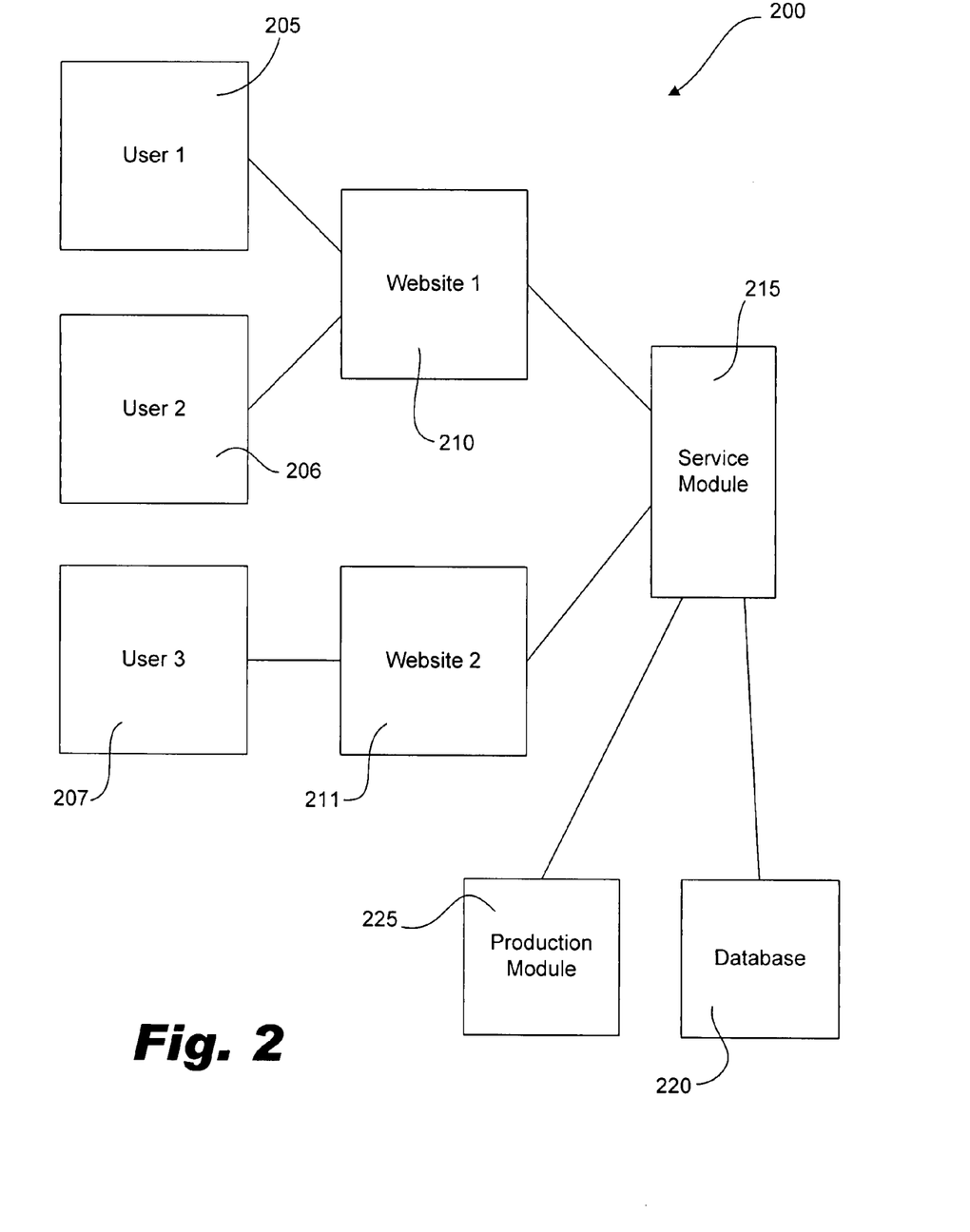
FIG. 2 is a diagram of an illustrative system according to principles described herein.

Turning now to FIG. 2, a block diagram of another illustrative system (200) is shown. The system (200) includes a plurality of users (205, 206, 207), a plurality of websites (210, 211), a service module (215), a database (220), and a production module (225).

In FIG. 2, two users (205, 206), each respectively operating a separate computer or computing element, are shown connected to the first website (210), and a third user (207) also operating a separate computer or computing element is shown connected to the second website (211). The two websites (210, 211) may each contain a tool such as the content tool described above. These tools may both be interfacing via network or other connection to a single service module (215). The service module (215) may be configured to serve any number of such websites (210, 211) and may be supported by any number of servers or other systems needed to serve the desired number of websites.

In this embodiment, the system (200) is configured such that each user (205, 206, 207) would interact with a single shared service module (215) through the use of a content tool imbedded on a website (210, 211). Otherwise, the operation of the content tool, service module (215), database (220) and production module (225) may be the same as described above in connection with FIG. 1. As illustrated in FIG. 2, the principles described herein can be implemented in any number of different system configurations to provide the desired services to the users.

Figure 3:
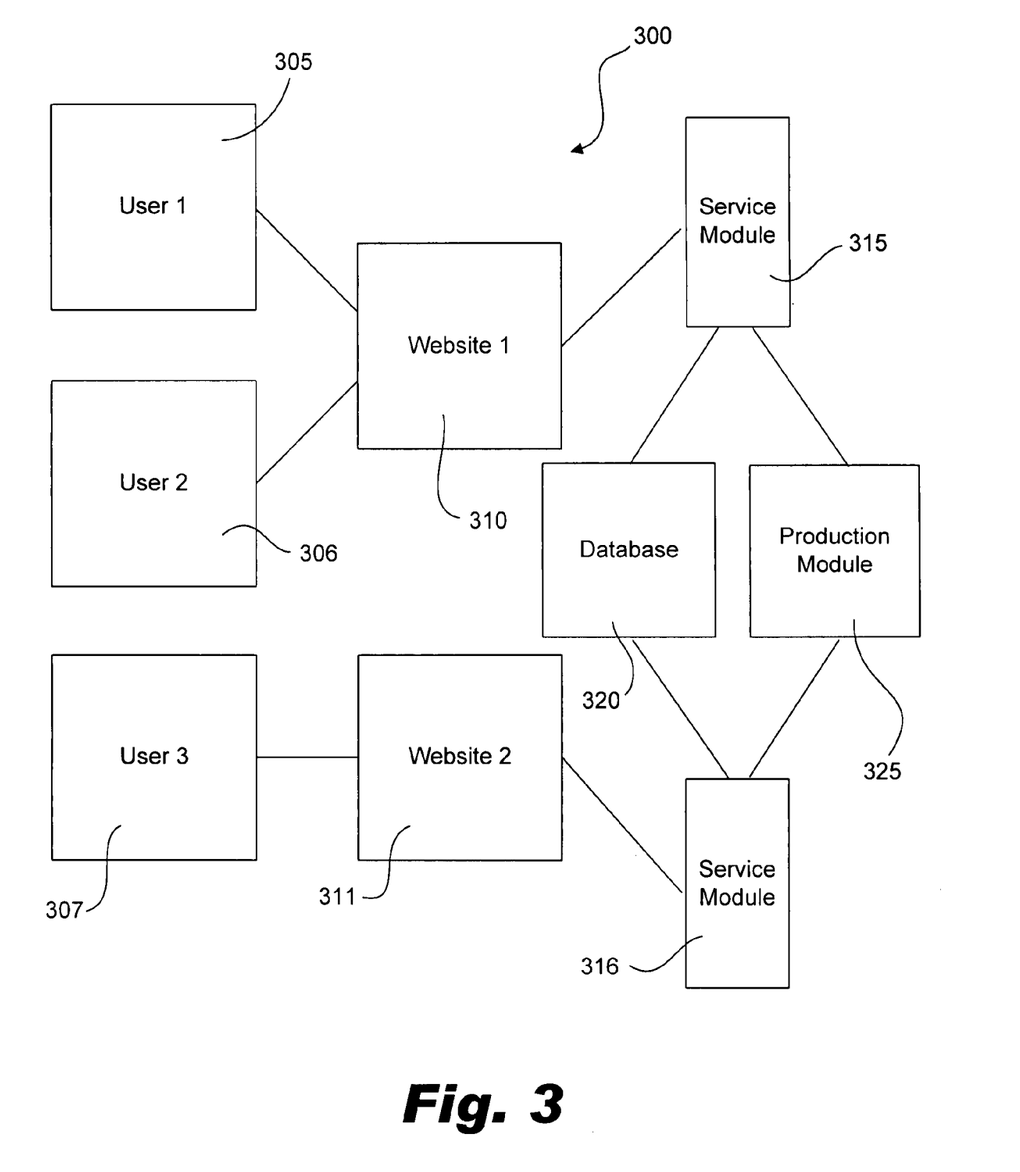
FIG. 3 is a diagram of an illustrative system according to principles described herein.

FIG. 3 illustrates how the present system (300) may be deployed on multiple websites (310, 311) each with a dedicated service module (315, 316) with reference to a single shared content database (320) and production module (325). Again, the principles described herein can be implemented in any number of different system configurations to provide the desired services to the users.

In these embodiments, represented by FIG. 3, the service module (315, 316) or its functionality may be integrated into the content tool implemented by the websites (310, 311). Each website (310, 311) would include a service module which may communicate directly via the network with the database (320) and production module (325). Such a service module may, for example, be written in JavaScript or another language that would allow the service module to be served up in and with each website (310, 311) and executed on the users' (305, 306, 307) individual computers.

Illustrative Methods

Figure 4:
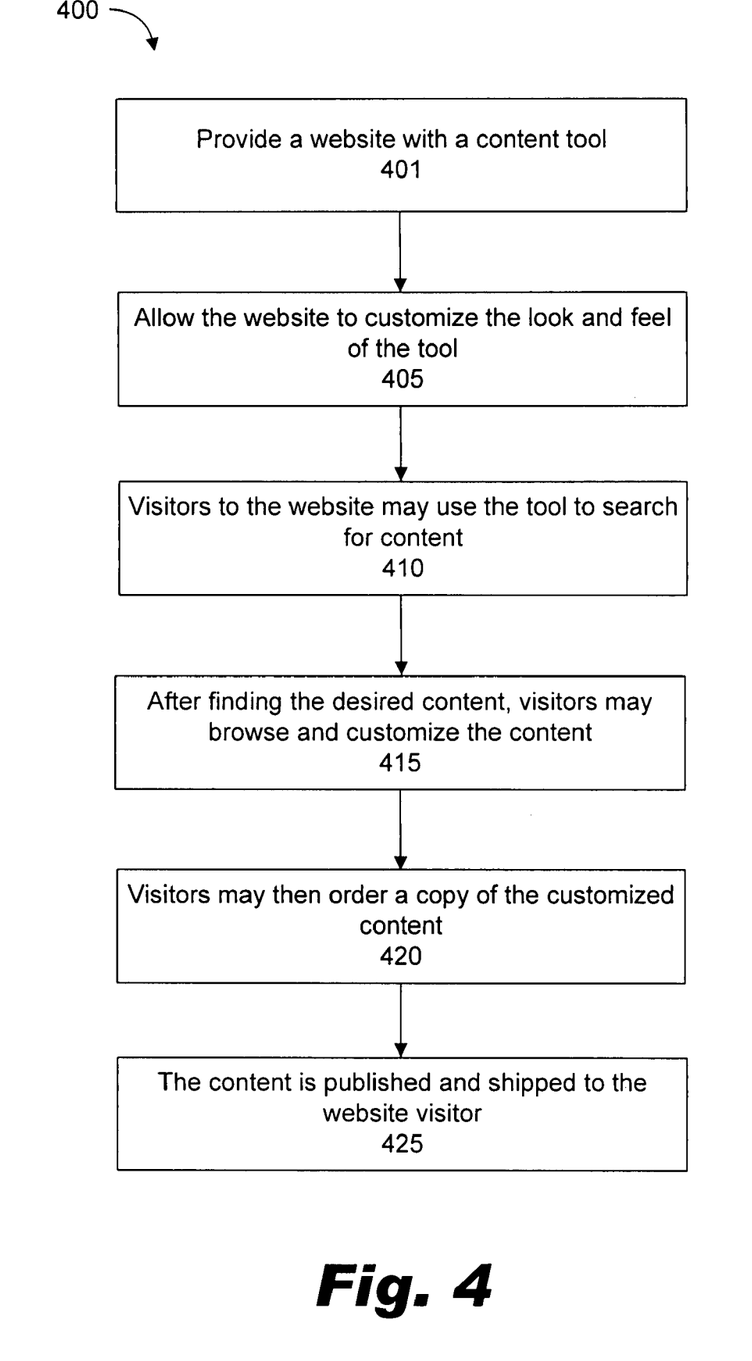
FIG. 4 is a flowchart illustrating an illustrative embodiment of a method for providing content according to principles described herein

Referring now to FIG. 4, a flowchart is shown of an illustrative method for providing content. The illustrative method (400) provides for selecting and ordering customizable printed content, for example a book, on a specific subject without a user ever having to leave a particular site. The first step is providing (step 401) a website with a content tool as described above. This tool may be designed so that it may be easily incorporated into any website. The tool may be invoked from all of the website pages or from only one or a few specific pages.

As noted above, the website operator may be able to customize (step 405) the look and feel of the tool in order to let the tool blend in and fit with the website. This may be done in many ways, as will be appreciated by those skilled in the art. For example, the color, size, font and other characteristics of the tool can be matched to corresponding characteristics of the host website. Additionally, the tool could be customized in order to appear in a frame or location designated by the website operator.

The tool may be used by visitors to the website to search (step 410) for content related to the theme or subject of the website or related subjects. This searching may be accomplished by a query to a back end database as described above. In some cases, the search may be narrowed and made relevant to the current context through the use of categories specified by the website owner. These categories may be fine tuned over time to improve the relevance and speed of the search.

Once the user has found content that he or she is interested in, the tool allows the user to browse and customize (step 415) the content as described above. This may include searching within the content, writing notes or reviews, uploading personal files and selecting or defining various print options for example as described above. The user may also be allowed to add additional content from other sources. The operator of the website may also customize products sold through the tool. For example, by incorporating a logo, name, special cover, or targeted advertising into content selected or produced using the tool. The user may then be offered the opportunity to buy or order (step 420) a copy of the customized content.

After a user has placed an order, the content may be printed, bound, and shipped (step 425) to the user. The binding may be any sort of binding as known to those skilled in the art. Examples may include but are not limited to ring-bound, spiral-bound, spine-bound, prefect-bound, or hardbound. Additionally, the tool may automatically calculate any commission earned by the website or any holders of licenses or copyrights to the content, and payment may be distributed accordingly.

Illustrative Embodiment

Figure 5A:
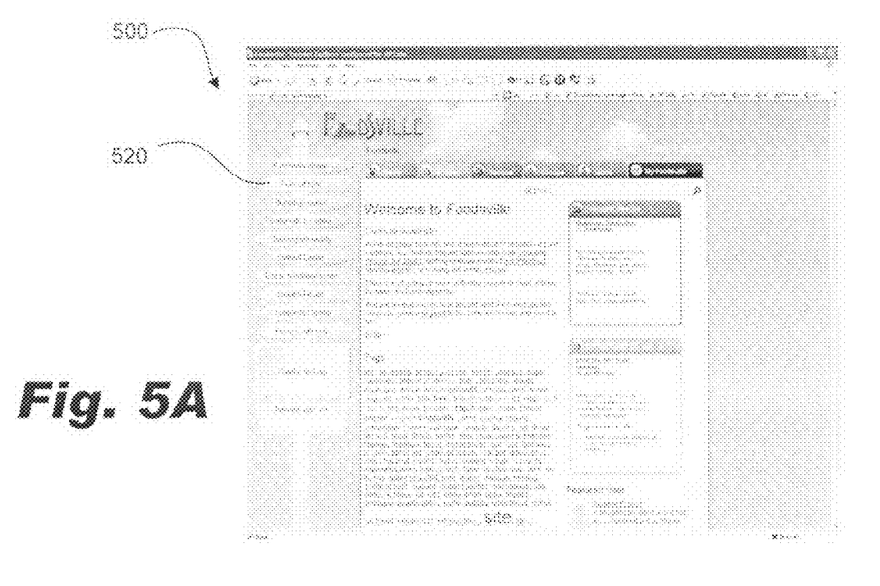
FIGS. 5A and 5B are illustrations of a website that may be displayed to a user during the course of providing content to users according to principles described herein.
Figure 5B:
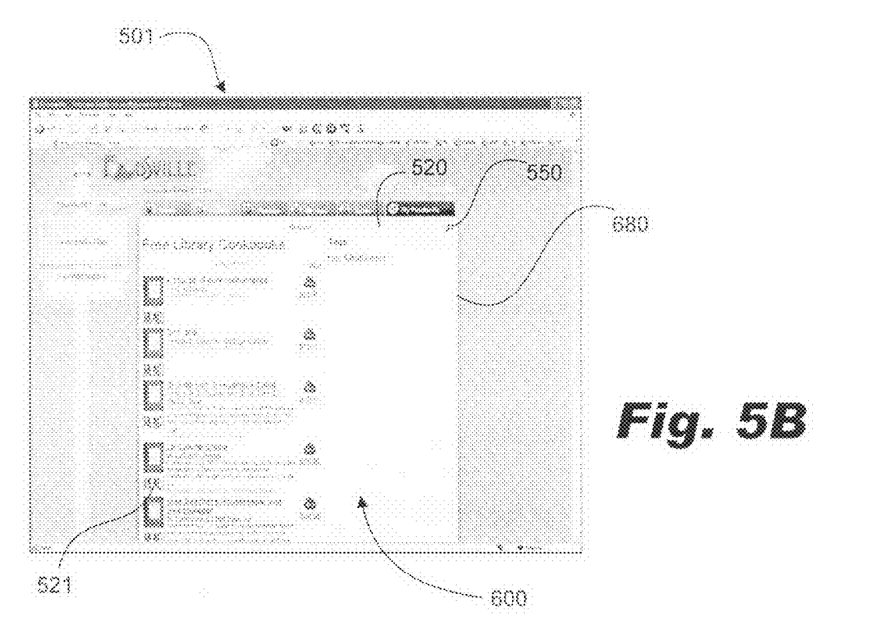
Figure 6:
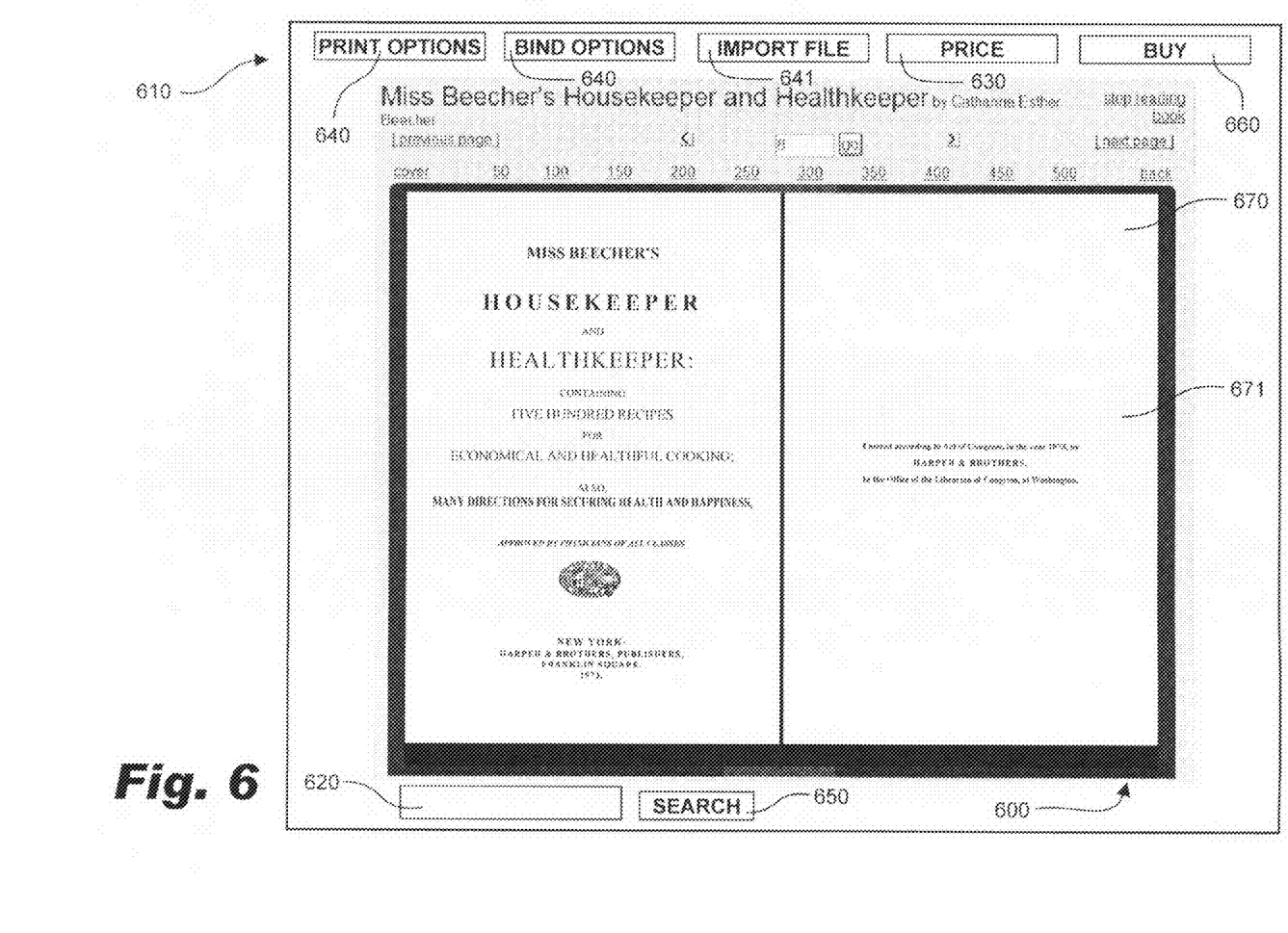
FIG. 6 is an illustration of a website that may be displayed to a user during the course of providing content to users according to principles described herein.

Turning now to FIG. 5A, an illustrative website (500) is depicted. This website, and the modified version shown in FIGS. 5B and 6, are merely examples of the concepts described in this specification. It will be appreciated that these concepts can be incorporated into any website. Shown in FIG. 5A is a website (500) that discusses food and home resources, such as cooking resources. The operator of this site has incorporated the tool into their site and made a menu button (520) with the title "Free Library". The title, shape and colors of the button may be customized or chosen by the website owner. In the illustrated example, the button for the tool has been integrated into an existing menu displayed in the form of a signpost.

When visitors to the page select the "Free Library" button, they may be presented with a page (501) like that shown in FIG. 5B. The illustrated webpage (501) includes a tool (600) as described herein. The tool (600) is located in a frame (680) which the website owner or operator has designated. The tool (600) includes a text area (520) into which a user may enter one or more search terms. When the user clicks the "Search" button (550), the results of their search may be displayed in the frame (680).

As shown in FIG. 5B, a search of content relevant to the subject matter of the website (500) has been conducted, with or without additional user parameters, and a listing of relevant content from the available database is shown. With each of these listings is a "READ" button (521) that can be selected to access the indicated content. Once the user has selected content, it may be displayed, and the user may be allowed to browse and/or customize it.

FIG. 6 depicts an illustrative webpage (610) displaying a tool (600) as described herein into which selected content has been pulled for browsing and/or customization. In the present example, the user has selected a book (670). The book (670) is being displayed and the user may browse through it by clicking on the top or right-hand page (671) and dragging towards the left. As the user drags the mouse to the left, the next page is revealed. This is a very intuitive way for a user to browse a book because of its similarity to reading a hardcopy of the same book. The user may also search within the content of the book specifically by using the search box (620) and search button (650).

In addition to showing the selected content, the user may be presented with the ability to customize it. In the current example, several controls (640) are available which the user may select in order to change the way that the book will be printed or bound. Using other controls (e.g., 641), the user may be able to add or mix content from different sources, add personalized content such as pictures, or otherwise personalize the content. The prices (630) of different options are also shown. After the user is satisfied with the content, the user may choose to order and format the content. The user is then able to purchase the content. This may be accomplished by clicking the "Buy" button (660) shown.

A major advantage of the system described herein is the ability given to website owners and operators to offer their visitors content that is relevant to the subject of the website and related subjects in the current context without having to lose those visitors to another site. It may allow the website owners and operators to increase revenue and build better loyalty with their visitors. The consumers may also benefit because they are presented with content relevant to their current browsing and are able to customize the content to their liking. This may lead to more sales and increased customer satisfaction. The tool described may also allow content owners to make more content available. This is especially true in the case of out-of-print content, newly available content, and less popular 'niche' content. In some embodiments, the content database and on-demand publishing system described herein may be operated by a third party and made available to various website operators who integrate or link the third-party system into their respective websites as described herein. In such cases, the individual website operators are spared the expense of trying to establish and maintain a system for satisfying visitor desires and orders for additional related content.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A system for providing content, said system comprising:
a service module implemented by at least one processor and managed by a content provider, said service module being in communication with a content tool provided by said content provider and embedded in a third-party website that is independent from said service module and said content provider;
wherein said service module allows a visitor to said third-party website to search, select and customize content located in a database accessible to said service module through said embedded content tool; and
wherein said service module allows said visitor to order a copy of said content as customized by said visitor through the content tool embedded in the third-party website.

2. The system of claim 1, further comprising a production module in communication with said service module for producing said copy of said content.

3. The system of claim 2, wherein said production module prints said content in book form.

4. The system of claim 1, wherein said embedded content tool is configured for incorporation into any website.

5. The system of claim 1, wherein an appearance of said embedded content tool is configurable to match characteristics of said third-party website.

6. The system of claim 1, wherein said service module is configured to narrow a search by said visitor through said embedded content tool based on subject matter of said third-party website.

7. The system of claim 1, wherein said database comprises a database of electronic copies of books.

8. A method of providing content to users, comprising:
providing an embedded content tool to a third-party website, said content tool providing an interface to a service module independent from said third-party website;
searching a content database with said service module in response to a request from a visitor to said third-party website through said embedded content tool;
receiving in said service module a selection of content in said database from said visitor through said embedded content tool;
allowing said visitor to customize said content using said embedded content tool; and
initiating with said service module printing of said selected content as customized by said visitor on physical media.

9. The method of claim 8, wherein content in said database corresponds to subject matter on said third-party website.

10. The method of claim 8, wherein said searching automatically incorporates search parameters based on subject matter of said third-party website.

11. The method of claim 8, wherein said initiating of said printing is performed in response to a request from said visitor through said embedded content tool.

12. The method of claim 8, wherein allowing said visitor to customize said selected content comprises annotating said selected content.

13. The method of claim 8, wherein allowing said visitor to customize said selected content comprises reordering said selected content.

14. The method of claim 8, wherein allowing said visitor to customize said selected content comprises uploading from a computer of said user through said embedded content tool additional content that is added to said selected content from said database.

15. The method of claim 8, further comprising receiving at least one parameter for said printing from said visitor through said embedded content tool, said parameter selected from the group comprising: size, binding type and paper quality.

16. The method of claim 8, further comprising paying a commission to an operator of said third-party website in response to an order for said printing of said content.

17. The method of claim 8, further comprising shipping said selected content printing in book form to a purchaser.

18. The method of claim 8, further comprising allowing an operator of said third-party website to customize said content prior to printing.

19. The method of claim 8, further comprising allowing an operator of said third-party website to customize an appearance of said embedded content tool.

* * * * *